Oct. 10, 1939.  W. H. YOUNG  2,175,237
VIBRATORY ELECTRIC MOTOR
Original Filed July 2, 1935   2 Sheets-Sheet 2

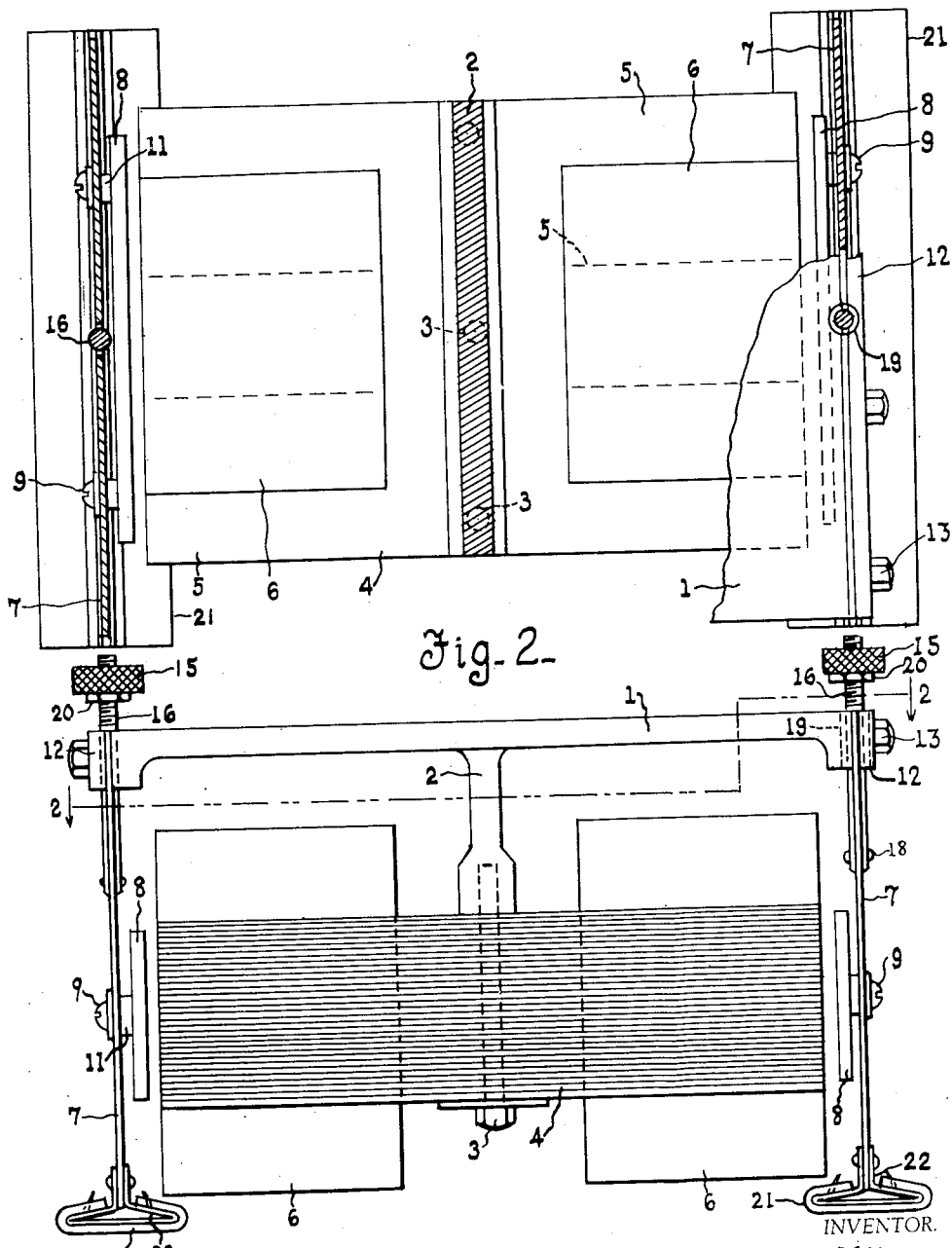

INVENTOR.
Walter H. Young
BY
J. S. Murray
ATTORNEY.

Patented Oct. 10, 1939

2,175,237

UNITED STATES PATENT OFFICE 2,175,237

VIBRATORY ELECTRIC MOTOR

Walter H. Young, Detroit, Mich.; James Van Fleet, administrator of said Walter H. Young, deceased, assignor, by decree of court and mesne assignments, to James Van Fleet, Detroit, Mich.

Application July 2, 1935, Serial No. 29,526
Renewed May 2, 1938

7 Claims. (Cl. 172—126)

This invention relates to electric motors and particularly electric motors acting by the periodic magnetic attraction and spring retraction of a suitable armature to impose on the latter a rapid vibration. While such a motor may serve a variety of purposes, it serves in the present disclosure to actuate a floor polisher.

Regulation of the amplitude of the vibration induced by a vibratory motor is, in many instances, quite desirable. Such regulation may serve to initially establish a desired amplitude, to correct such departures from the initial amplitude as may result from wear or working stresses, and occasionally to better adapt a motor to some required piece of work. Since the amplitude varies according as the natural rate of the vibrating element approaches synchronism with the energizing magnetic impulses, a regulation of said natural rate may serve to regulate the amplitude. Such a regulation is hereinafter termed "tuning".

An object of the invention is to provide for quickly, easily, and accurately tuning a vibratory electric motor, whether or not the motor is operating.

Another object is to affect tuning by adjustment of a weight on the vibratory element, and to derive such a counterbalancing effect from the weight, as will tend to minimize noise and vibration of the motor as a whole.

Another object is to provide for regulation of the leverage under which magnetic impulses are applied to the vibratory element.

A further object is to provide a duplex vibratory electric motor of simple and compact construction.

A still further object is to mount a working member, such as a floor polisher, jointly upon the vibratory elements of a duplex vibratory motor.

These and various other objects the invention attains by the construction hereinafter described, and illustrated in the accompanying drawings, wherein:

Fig. 1 is a view in side elevation of a floor polisher energized by the improved motor.

Fig. 2 is a horizontal sectional view of the same, taken on the line II—II of Fig. 1.

Figure 3:
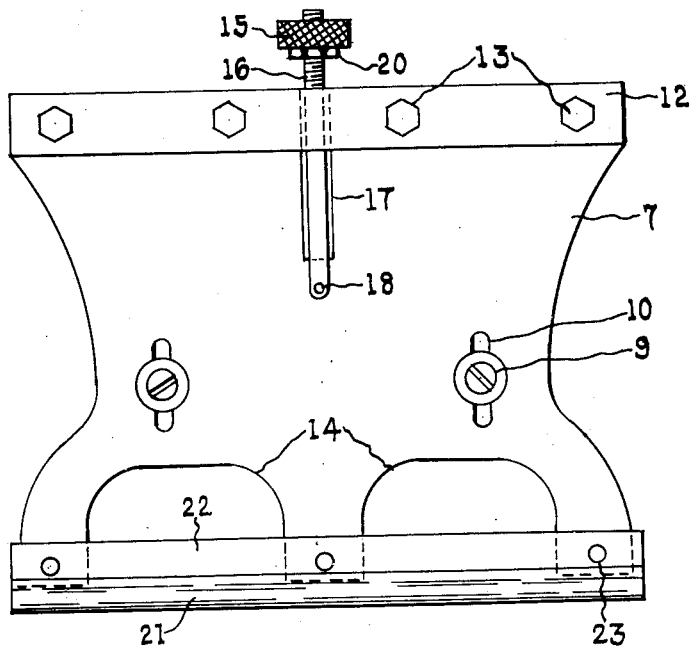
Fig. 3 is a front view of the floor polisher.

In these views, the reference character 1 designates a normally horizontal rectangular metal plate formed midway between its ends with a downwardly projecting rib 2. These parts 1 and 2 form a frame of an approximate T-shape. Rigidly secured to said rib by bolts 3 and spaced beneath the plate 1 by the rib is a laminated electro-magnet 4, the ends of which similarly form spaced polar legs 5. As illustrated, three such legs are formed by each end portion of the magnet, windings 6 being applied to the central legs.

To the ends of the plate 1 are similarly rigidly secured the upper margins of a pair of duplicate flexible sheet-metal vibrators 7, which extend downwardly past the magnet poles, and constitute supports for the entire appliance. These vibrators are of steel (or other magnetic material) and are hence responsive to the pull of the magnet. To increase the magnetic response of the vibrators, it is preferred to attach to each thereof a soft iron armature 8 opposed to the adjacent pole faces. As illustrated, the armatures 8 are each mounted on the corresponding vibrator 7 by a pair of bolts 9, and provision is made for a limited vertical adjustment of the armatures by vertically slotting the vibrators, as indicated at 10, to receive said bolts. It is preferred to interpose one or more small washers 11 between each vibrator and the corresponding armature, to prevent the latter from materially detracting from flexibility of the vibrator.

As illustrated, the vibrators are each clamped to the plate 1 by a metal bar 12 fastened to the ends of said plate by bolts 13. To reduce the weight of the vibrators and so render them more freely actuable by the magnet, one or more openings 14 may be formed in the lower portion of each vibrator.

For readily regulating the natural vibration rate of the vibrators and so tuning them to the magnetic impulse rate, it is preferred to equip each vibrator with an easily adjustable weight 15, and in order that these weights may have a modulating effect on the vibrators, it is preferred to position the weights above the fixed upper margins of the vibrators. Thus the weights are formed by milled nuts engaging suitably threaded rods 16, centrally upwardly projecting from the vibrators. Since the upper marginal portions of the plates are fixed, it is necessary to attach the rods some distance below such portions, so that they may respond to flexure of the vibrators. This is accomplished by locating the rods in slots 17 extended suitably downward from the upper edges of the vibrators, and rigidly attaching the lower ends of the rods to the corresponding edges of the slots. As shown, the rods have their lower ends notched to straddle the vibrators, and are riveted to the latter, as indicated at 18. Suitable openings 19 are formed around the rods, jointly in the plate 1 and clamping bars 12, to afford the rods a requisite lateral play. Each weight-forming nut 15 is preferably engaged by a suitable lock nut 20 to maintain adjustment of the former.

To the lower edges of the vibrators 7, are secured a pair of similar polishing pads 21 which transmit the weight of the appliance to a floor or other surface to be polished, and are reciprocatory against such floor or surface. As illustrated, said pads (which may be formed of felt or the like) are mounted on sheet metal holders 22, riveted (or otherwise rigidly secured) to the vibrators, as indicated at 23.

Ordinarily, the windings will be energized by an alternating current, the frequency of which will establish the rate of periodic attraction of the vibrators to the magnet. Thus, for example, in using A. C. current at sixty cycles (per second), the motor will induce vibration at seventy two hundred oscillations per minute. Each attraction of the vibrators will, of course, involve a flexure thereof about their upper margins from their normal vertical positions, counter flexure occurring during the low energization periods of the magnet.

In that form of the invention shown in Figs. 1 to 3 inclusive, the vibrators have relatively reverse movements, swinging toward each other under magnetic influence and springing in opposite directions during the low periods of such influence.

Figure 4:
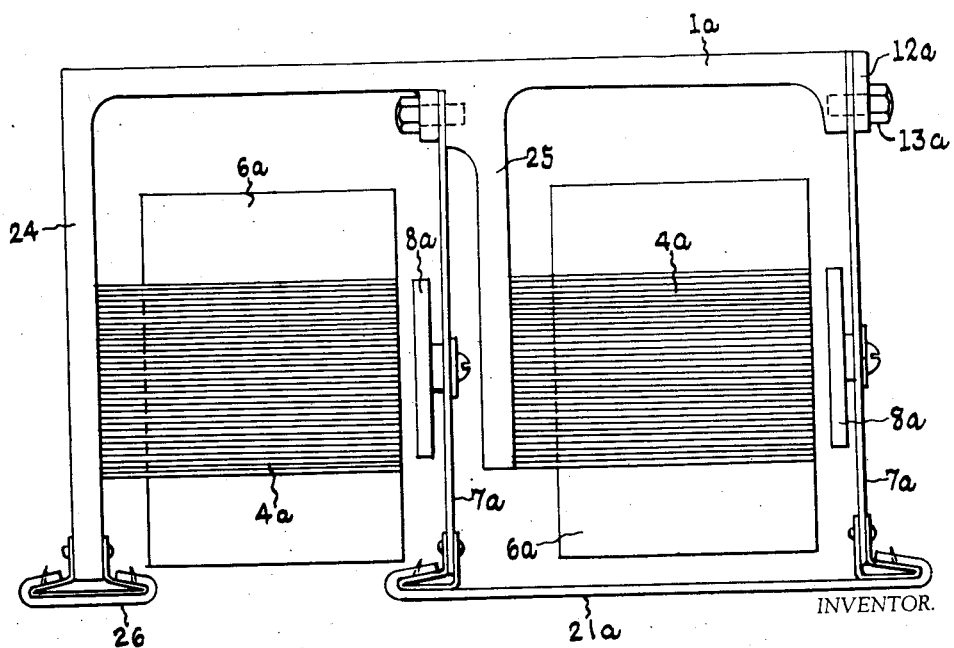
Fig. 4 is a side elevational view of a modified construction.

As modified in Fig. 4, the vibrators 7a are adapted to swing in unison, being disposed in a corresponding relation to their respective magnets 4a. The latter are similarly secured by welding or other suitable means to vertical plates 24 and 25 projecting downwardly from and integral with the top plate 1a of the frame. Thus a polishing pad 21a (or some other work-performing member) may be connected across the lower ends of the vibrators for reciprocation thereby jointly. To avoid instability, it is preferred to make the end plate 24 downwardly coextensive with the two vibrators and to provide on the lower end of said end plate an additional polishing pad 26.

It is to be noted that the nuts 15 are readily accessible for adjustment, and that the extent of their vibratory travel, while the motor is operating, is not sufficiently great to prevent convenient adjustment of said nuts.

For propelling the described polisher across a floor, it may be equipped with any suitable handle (not shown), attached in any well known manner.

While specifically described in its application to a floor polisher, the described motor may obviously serve, either in its duplex or a single form, to perform various other useful operations. It is also to be understood that while attachment of the soft iron armatures 8 to the sheet steel vibrators 7 is preferred, that it may suffice for some uses of the motor, to rely on the vibrators alone to serve as armatures.

The invention is presented as including all such modifications and changes as come within the scope of the following claims.

What I claim is:

1. A vibratory electric motor comprising an electro-magnet producing periodic magnetic impulses, a support, a resiliently flexible vibrator mounted on and flexible about the support to and from the magnet and comprising an armature for the magnet, and a weight carried by the vibrator and adjustable to and from the support, the vibrator being engaged by the support between its armature portion and the weight.

2. A vibratory electric motor comprising an electro-magnet producing periodic magnetic impulses, a support, a resiliently flexible vibrator mounted substantially rigidly on and flexible about the support to and from the magnet and comprising an armature for the magnet, a weight for modulating the vibrator mounted on the vibrator between its armature portion and the support, the support being positioned between such weight and armature portion.

3. A vibratory electric motor comprising an electro-magnet producing periodic magnetic impulses, a support, a vibrator mounted on and flexible about the support to and from the magnet and comprising an armature for the magnet, a threaded member carried by the vibrator and elongated and having a thread extending toward the support, and a weight threaded on such member for adjustment to and from the support to vary the natural rate of vibration of the vibrator.

4. A vibratory electric motor comprising an electro-magnet, a support, a sheet metal vibrator mounted on and flexible about the support to and from the magnet and comprising an armature for the magnet and being slotted toward its armature portion from the support, a rod mounted on the vibrator between its support and its armature portion, and projecting through the slot and beyond the support and a weight carried by the rod beyond the support.

5. A vibratory electric motor as set forth in claim 4, the weight being screw-threaded on the rod for adjustment to and from the support.

6. A vibratory electric motor comprising an electro-magnet producing periodic magnetic impulses, a support, a vibrator flexible about the support to and from the magnet responsive to such impulses, a weight holder secured to the vibrator and projecting, free of the vibrator, toward and beyond the support, and a weight carried by said holder beyond the support and adjustable to and from the support.

7. In a vibratory electric motor, a vibrator formed of flexible sheet material and having a supporting margin and an opposed free margin, means confining such vibrator at its supported margin, a weight holder secured to the vibrator at a point between said margins, and extending, free of the vibrator, from said point and projecting beyond the supporting margin, and a weight adjustable to and from said vibrator, on the projecting portion of said holder to modulate the vibrations.

WALTER H. YOUNG.